US008715842B2

(12) United States Patent
Lee et al.

(10) Patent No.: US 8,715,842 B2
(45) Date of Patent: May 6, 2014

(54) BATTERY PACK

(75) Inventors: Sangjoo Lee, Yongin-si (KR); Heuisang Yoon, Yongin-si (KR); Jeongdeok Byun, Yongin-si (KR)

(73) Assignee: Samsug SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 862 days.

(21) Appl. No.: 12/652,831

(22) Filed: Jan. 6, 2010

(65) Prior Publication Data
US 2010/0178534 A1    Jul. 15, 2010

(30) Foreign Application Priority Data

Jan. 13, 2009    (KR) .................. 10-2009-0002579

(51) Int. Cl.
*H01M 2/04* (2006.01)
*H01M 14/00* (2006.01)

(52) U.S. Cl.
USPC ............................................. 429/7; 429/175

(58) Field of Classification Search
CPC ... H01M 2/0404; H01M 2/0473; H01M 2/34; H01M 10/425; H01M 10/4257
USPC ................................. 429/7, 96–100, 162–187
See application file for complete search history.

(56) References Cited

U.S. PATENT DOCUMENTS

| 7,479,758 B2 | 1/2009 | Moon |
| 2005/0208345 A1 | 9/2005 | Yoon et al. |
| 2006/0091851 A1 * | 5/2006 | Kim ............................. 320/112 |
| 2006/0115715 A1 | 6/2006 | Ge et al. |
| 2006/0246349 A1 | 11/2006 | Uh |
| 2007/0154784 A1 * | 7/2007 | Seo ................................. 429/61 |
| 2007/0202364 A1 * | 8/2007 | Uh et al. ........................... 429/7 |
| 2008/0008910 A1 * | 1/2008 | Koh ................................. 429/7 |
| 2008/0102368 A1 | 5/2008 | Sumida et al. |
| 2008/0171235 A1 * | 7/2008 | Seo et al. ......................... 429/7 |
| 2008/0176134 A1 | 7/2008 | Kim |
| 2008/0292913 A1 | 11/2008 | Hong et al. |
| 2008/0292955 A1 | 11/2008 | Byun et al. |
| 2008/0297360 A1 | 12/2008 | Knox et al. |
| 2010/0143793 A1 | 6/2010 | Yamamoto |

FOREIGN PATENT DOCUMENTS

| KR | 1020050077744 A | 8/2005 |
| KR | 10200739596 A | 4/2007 |
| KR | 1020070097035 A | 10/2007 |
| KR | 100791551 B1 | 12/2007 |
| KR | 1020080017321 A | 2/2008 |
| KR | 1020080065132 A | 7/2008 |
| WO | 2009025433 A1 | 2/2009 |

OTHER PUBLICATIONS

Korean Examination Report issued by KIPO dated Aug. 17, 2010, No. 10-2009-0002579 together with a Request for Entry.
Korean Notice of Allowance issued by KIPO, dated Feb. 15, 2011, corresponding to Korean Patent Application No. 10-2009-0002579, together with Request for Entry.

* cited by examiner

Primary Examiner — Maria J Laios
(74) Attorney, Agent, or Firm — Robert E. Bushnell, Esq.

(57) ABSTRACT

A battery pack that includes a bare cell, a protection circuit module arranged on the bare cell and a case arranged on the protection circuit module, wherein the protection circuit module and the case include coupling members to couple the protection circuit module to the case.

18 Claims, 8 Drawing Sheets

BATTERY PACK

CLAIM OF PRIORITY

This application makes reference to, incorporate the same herein, and claims all benefits accruing, and claims all benefits accruing under 35 U.S.C. §119 from an application for BATTERY PACK earlier filed in the Korean Intellectual Property Office on 13 Jan. 2009 and there duly assigned Serial No. 10-2009-0002579.

BACKGROUND OF THE INVENTION

1. Field of the Invention

The present invention relates to a design for a battery pack.

2. Description of the Related Art

A bare cell, which includes a positive electrode plate, a negative electrode plate, an electrolyte, and a separator, supplies electrical power to an external electronic device, and is re-used through repeated charge-discharge cycles. A protection circuit module is responsible for protecting a secondary battery from overcharge and overcurrent and preventing battery deterioration caused by overdischarge.

A bare cell and a protection circuit module are assembled into a pack along with a case. At this time, it is important to configure the pack to have a strong and compact structure. Often, a holder is required to support the protection circuit module within a battery. These extra parts increase the complexity of the manufacture of the battery pack and increase the costs of the battery pack. What is needed is a design for a battery pack that provides greater structural strength within the battery pack while reducing the costs and complexity of producing the battery pack.

SUMMARY OF THE INVENTION

The present invention provides a battery pack wherein a protruding portion of a protection circuit module is fitted into an aperture of a case. Therefore, the battery pack exhibits an improved structural strength and does not require a holder, thereby leading to reduced manufacturing costs and processes.

According to an aspect of the present invention, there is provided a battery pack including a bare cell, a protection circuit module arranged on the bare cell and a case arranged on the protection circuit module, wherein the protection circuit module and the case include coupling members to couple the protection circuit module to the case.

The protection circuit module can include a protection circuit board arranged on the bare cell and separated from the bare cell by a distance, the protection circuit board including first and second short sides and first and second long sides and first and second tabs respectively arranged on bottom surfaces of the first and second short sides of the protection circuit board. The first and second tabs respectively can include first and second protruding portions that protrude out of each of the first and second long sides of the protection circuit board. The case can include first and second apertures receiving the first and second protruding portions, respectively. The first and second protruding portions and the first and second apertures can be the coupling members. The case can include a first surface facing upward and second and third surfaces extending downward from the first surface, the first and second apertures are arranged in each of the second and third surfaces, respectively.

The first and second tabs can have a square shape. Each of the first and second protruding portions can have a tapered end. The protection circuit module can also include a dummy tab arranged between the first and second tabs. The dummy tab can include a dummy protruding portion that protrudes out of each of the first and second long sides of the protection circuit board. The case can also include a dummy aperture receiving the dummy protruding portion. The dummy protruding portion and the dummy aperture can be the coupling members. The case can include a first surface facing upward and second and third surfaces extending downward from the first surface, the dummy aperture being arranged in each of the second and third surfaces. The dummy tab can have a square shape. The dummy protruding portion can have a tapered end. The protection circuit module can be arranged on a surface of the bare cell.

The battery pack can also include an insulating tape arranged between the bare cell and the protection circuit module. The protection circuit module can also include first and second lead plates connected to the first and second tabs, respectively. The first and second tabs can be electrically connected to the first and second lead plates, respectively. The first lead plate can be electrically connected to an electrode terminal arranged on a surface of the bare cell, and the second lead plate can be electrically connected to the opposite surface of the bare cell. The first and second lead plates can be connected to a cap plate of the bare cell. The first lead plate can be electrically connected to the cap plate of the bare cell, and the protection circuit module can also include a negative electrode lead plate electrically connected to an electrode terminal of the bare cell.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
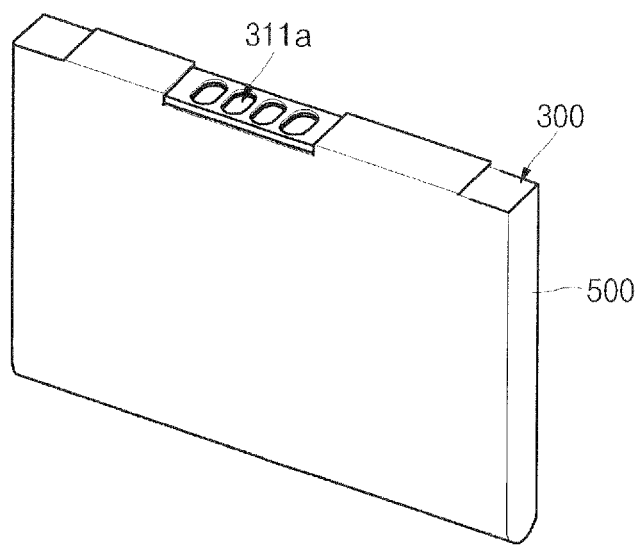
FIG. 1 is a perspective view of a battery pack according to a first embodiment of the present invention.

The present invention will be described more fully hereinafter with reference to the accompanying drawings in which preferred embodiments of the invention are shown. The invention can, however, be embodied in many different forms and should not be construed as being limited to the embodiments set forth herein. Rather, these embodiments are provided so that this disclosure will be thorough and complete, and will fully convey the scope of the invention to those skilled in the art. Throughout the specification, the same reference numerals refer to the same elements. Hereinafter, battery packs according to various exemplary embodiments of the present invention will be described in detail with reference to the drawings.

Figure 2:
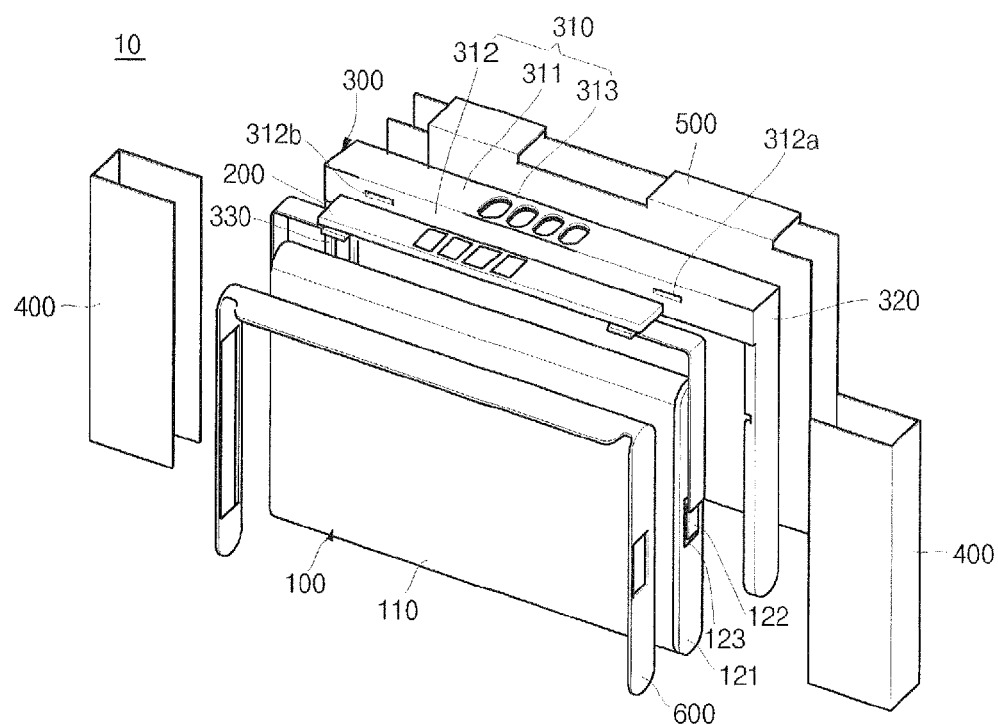
FIG. 2 is an exploded perspective view of the battery pack of FIG. 1.
Figure 3:
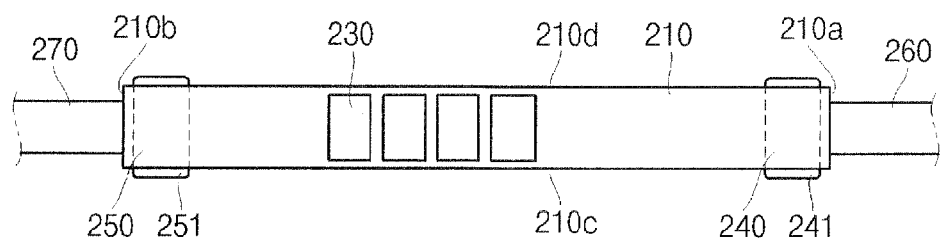
FIGS. 3 through 5 are respectively a top view, a bottom view, and a side view of a protection circuit module of the battery pack according to the first embodiment of the present invention.
Figure 4:
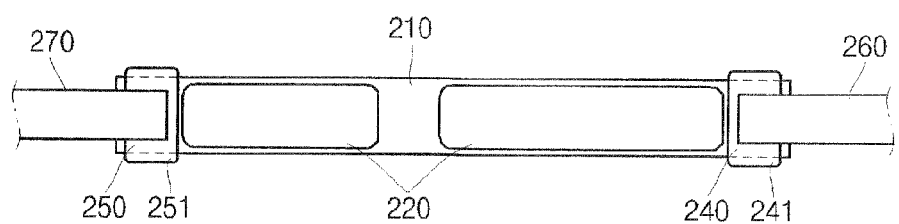
Figure 5:
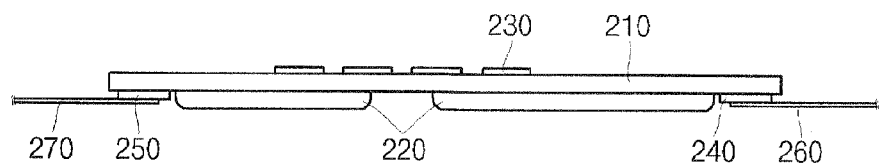

Turning now to FIGS. 1 through 5, FIGS. 1 and 2 are respectively a schematic perspective view and an exploded perspective view of a battery pack 10 according to the first embodiment of the present invention, and FIGS. 3 through 5 are respectively a top view, a bottom view, and a side view of a protection circuit module 200 of the battery pack 10 according to the first embodiment of the present invention.

Referring to FIGS. 1 through 5, the battery pack 10 can include a bare cell 100, the protection circuit module 200, a case 300, a lateral tape 400, and a label 500. An insulating tape 600 can be further arranged between the bare cell 100 and the protection circuit module 200. The protection circuit module 200 and the case 300 can include coupling members for connection therebetween. In detail, the battery pack 10 is configured so that protruding portions of the protection circuit module 200 are fitted into apertures of the case 300, thereby leading to a higher coupling force between the protection circuit module 200 and the case 300, resulting in improved structural strength of the battery pack 10. Further, due to such fitting between the protruding portions of the protection circuit module 200 and the apertures of the case 300, the battery pack 10 does not require a holder for supporting the protection circuit module 200 on a side surface of the bare cell 100, thereby leading to reduced manufacturing costs and processes.

The bare cell 100 can include a can 110, an electrode assembly (not shown), and a cap assembly (not shown) that are combined to each other. The electrode assembly is inserted into the can 110 via an open side of the can 110, and the open side is sealed by the cap assembly. The bare cell 100, which is an essential element of the chargeable/dischargeable battery pack 10, includes a positive electrode and a negative electrode for charge-discharge cycling of the battery pack 10. In FIG. 2, a surface that an electrode terminal 122 is arranged defines a top surface (right of FIG. 2), a surface that the top surface is opposite defines a bottom surface (left of FIG. 2), a surface that the protection circuit module 200 is arranged defines a side surface (top of FIG. 2), and a surface that the side surface is opposite defines another side surface (bottom of FIG. 2).

The can 110 can have substantially a rectangular parallelepiped shape. A top side of the can 110 can be open and side surfaces thereof can be curved. The can 110 can be made out of a light metal material such as aluminum (Al), and can serve as the positive terminal. The electrode assembly (as will be described later) and an electrolyte solution (not shown) can be inserted into the open side of the can 110.

The electrode assembly can include a positive electrode plate (not shown), a negative electrode plate (not shown), and a separator (not shown) arranged between the two electrode plates. The electrode assembly can be produced by winding the positive electrode plate, the negative electrode plate, and the separator into a jelly roll-type structure. The electrode assembly can be inserted into the can 110 via the opening of the can 110.

The cap assembly can include a cap plate 121, an electrode terminal 122, a gasket 123, an insulating plate (not shown), and a terminal plate (not shown). The cap assembly can be combined with the electrode assembly along with an insulating case (not shown) to seal the open side of the can 110. The electrode terminal 122 can serve as a negative terminal.

The protection circuit module 200 can include a protection circuit board 210, a protection circuit device 220, a charge-discharge terminal 230, a first tab 240, a second tab 250, a first lead plate 260, and a second lead plate 270. The first tab 240 and the second tab 250 include coupling members for connecting the protection circuit module 200 to the case 300. The protection circuit module 200 can further include a positive temperature coefficient (PTC) device (not shown) arranged below the protection circuit board 210 or at the first lead plate 260.

The protection circuit board 210 can be arranged on the bare cell 100 and be separated from the bare cell 100 by a predetermined distance. In more detail, the protection circuit board 210 can be arranged on a side surface (in FIG. 2) of the bare cell 100, and can have substantially a rectangular plate shape. A conductive metal pattern can be present on the protection circuit board 210, and can be electrically connected to the protection circuit device 220, the charge-discharge terminal 230, the first tab 240, and the second tab 250. The protection circuit board 210 can be a printed circuit board (PCB). When the protection circuit board 210 is viewed from top as in FIG. 3, two short sides are defined as a "first short side 210a" and a "second short side 210b", and two long sides as a "first long side 210c" and a "second long side 210d".

The protection circuit device 220 can be arranged between the bottom surface of the protection circuit board 210 and the side surface of the bare cell 100, as viewed in FIGS. 2 through 4. The protection circuit device 220 is responsible for protecting the bare cell 100 by monitoring information about the charge-discharge state, current, voltage, temperature and other details of the bare cell 100. The protection circuit device 220 can be electrically connected to the conductive metal pattern on the protection circuit board 210.

The charge-discharge terminal 230 is arranged on the protection circuit board 210 and can serve as an electrical connector that connects the battery pack 10 to an external electronic device (not shown). The first tab 240 can be arranged below the first short side 210a of the protection circuit board 210, and can have substantially a square plate shape. The first tab 240 is designed to partially protrude out of each of the first long side 210c and the second long side 210d of the protection circuit board 210, and the protruding portions of the first tab 240 are defined as a "first protruding portion 241". In this respect, the first tab 240 can include a pair of first protruding portions 241. The first tab 240 can be made out of nickel or nickel alloy and can be electrically connected to the conductive metal pattern of the protection circuit board 210.

The second tab 250 can be arranged below the second short side 210b of the protection circuit board 210, and can have substantially a square plate shape. The second tab 250 is designed to partially protrude out of each of the first long side 210c and the second long side 210d of the protection circuit board 210, and the protruding portions of the second tab 250 are defined as a "second protruding portion 251". In this respect, the second tab 250 can include a pair of second protruding portions 251. The second tab 250 can be made out of nickel or nickel alloy, and can be electrically connected to the conductive metal pattern on the protection circuit board 210.

The first lead plate 260 can be arranged at the first short side 210a of the protection circuit board 210. The first lead plate 260 can be folded at an angle of 90 degrees at a contact edge of the top and side surfaces of the bare cell 100, as viewed in FIG. 2. An end of the first lead plate 260 can be electrically connected to a bottom surface of the first tab 240 through welding, and the other end can be electrically connected to the electrode terminal 122 arranged on a top surface of the bare cell 100. The electrode terminal 122 is connected to the negative electrode plate of the electrode assembly through welding, and thus has a negative polarity. Thus, the first lead plate 260 and the first tab 240 electrically connected to the electrode terminal 122 also have a negative polarity. The can 110 and the cap plate 121 have a positive polarity. In this regard, in order to prevent a short circuit between the can 110 or the cap plate 121 and the first lead plate 260, the insulating tape 600 can be arranged between the bare cell 100 and the protection circuit module 200.

The second lead plate 270 can be arranged at the second short side 210b of the protection circuit board 210. The second lead plate 270 can be folded at an angle of 90 degrees at a contact edge of the bottom and side surfaces of the bare cell 100, as viewed in FIG. 2. An end of the second lead plate 270 can be electrically connected to a bottom surface of the second tab 250 through welding, and the other end can be electrically connected to the bottom surface of the bare cell 100. The positive electrode plate of the electrode assembly can be electrically connected to the cap plate 121 through welding. The can 110 is electrically connected to the cap plate 121 through welding, and thus, has a positive polarity. Thus, the second lead plate 270 and the second tab 250 have a positive polarity.

The case 300 is arranged on the protection circuit module 200, and more specifically, it can be arranged to surround the protection circuit module 200 and the top and bottom surfaces of the bare cell 100. The case 300 can include a first section 310 corresponding to the protection circuit board 210, and second and third sections 320 and 330 respectively corresponding to the top and bottom surfaces of the bare cell 100. In more detail, the first section 310 includes a first surface 311 which corresponds to a top surface of the protection circuit module 200 and has a rectangular shape. The first section 310 also includes second and third surfaces 312 and 313 that extend downward from two long sides of the first surface 311 and also have a rectangular shape. The first surface 311 of the first section 310 of the case 300 can have a charge-discharge terminal receiving aperture 311a (see FIG. 1) corresponding to the charge-discharge terminal 230 of the protection circuit module 200 so that the charge-discharge terminal 230 can be exposed to outside through the charge-discharge terminal receiving aperture 311a.

Each of the second and third surfaces 312 and 313 of the first section 310 of the case 300 can have a first aperture 312a and a second aperture 312b which respectively correspond to the first protruding portion 241 and the second protruding portion 251 of tabs 240 and 250. In more detail, the first aperture 312a and the second aperture 312b can perforate the second surface 312 to respectively correspond to the first protruding portion 241 and the second protruding portion 251, and similarly, the first aperture 312a and the second aperture 312b can also be formed in the third surface 313 to respectively correspond to the first protruding portion 241 and the second protruding portion 251. The first and second apertures 312a and 312b can have shapes corresponding to the first and second protruding portions 241 and 251 so that the first and second protruding portions 241 and 251 can be fitted into the first and second apertures 312a and 312b.

The lateral tape 400 can be arranged on the top and bottom surfaces of the bare cell 100 to cover the second and third sections 320 and 330 of the case 300, thereby providing a higher coupling force between the case 300 and the bare cell 100. The label 500 is responsible for covering the bare cell 100 and the case 300 and protects the bare cell 100 and the protection circuit module 200 from external impact.

Hereinafter, the connection relationship between the first protruding portion 241 of the first tab 240 and the first aperture 312a as well as the connection relationship between the second protruding portion 251 of the second tab 250 and the second aperture 312b will be described in detail. The connection relationship between the first protruding portion 241 and the first aperture 312a and the connection relationship between the second protruding portion 251 and the second aperture 312b can be explained with the same principle. Thus, only the connection relationship between the first protruding portion 241 and the first aperture 312a will now be described.

Figure 6:
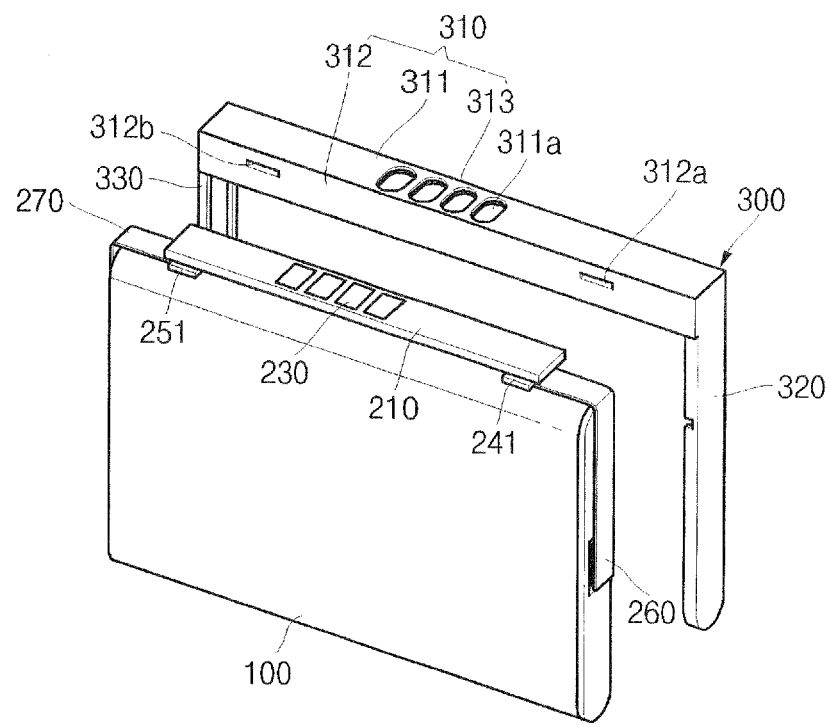
FIG. 6 is a partial exploded perspective view of the battery pack of FIG. 1.
Figure 7:
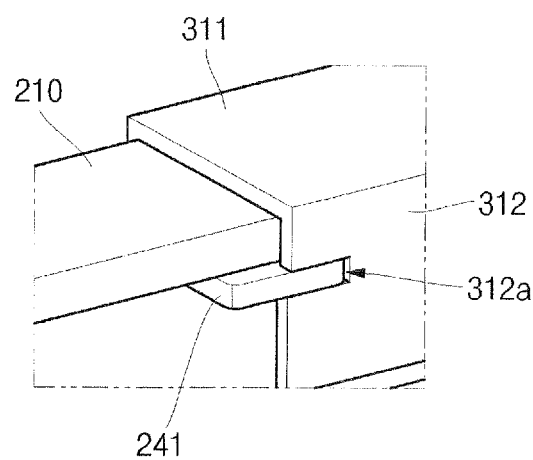
FIG. 7 is a partial enlarged view of the battery pack of FIG. 1.

FIGS. 6 and 7 are respectively a partial perspective view and a partial enlarged view of the battery pack 10 of FIG. 2. Referring to FIGS. 6 and 7, together with FIGS. 1 through 5, as described above, the first tab 240 of the protection circuit module 200 can have the first protruding portion 241 which protrudes out of each of the first and second long sides 210c and 210d of the protection circuit board 210. The second and third surfaces 312 and 313 of the first section 310 of the case 300 can have the first aperture 312a which has a shape corresponding to the first protruding portion 241 and at a corresponding location of the first protruding portion 241. The first protruding portion 241 and the first aperture 312a can serve as coupling members for connecting the protection circuit module 200 to the case 300.

As described above, the first protruding portion 241 and the first aperture 312a are coupled to each other. Specifically, the first protruding portion 241 is forcedly fitted into the first aperture 312a so that the protection circuit module 200 and the case 300 can be joined together firmly. An end of the first protruding portion 241 facing the first aperture 312a can be tapered in order to facilitate such fitting between the first protruding portion 241 and the first aperture 312a.

In the battery pack 10 according to the first embodiment of the present invention, the first protruding portion 241 of the protection circuit module 200 is fitted into he first aperture 312a of the case 300, thereby leading to a higher coupling force between the protection circuit module 200 and the case 300, resulting in the improved structural strength of the battery pack 10. Here, the first protruding portion 241 is a predetermined protruding portion of the first tab 240 electrically connected to the first lead plate 260 of the protection circuit module 200. That is, the first tab 240, which is an essential element for electrical connection between the bare cell 100 and the protection circuit module 200, can be configured to protrude out of the first and second long sides 210c and 210d of the protection circuit board 210, thereby enabling easy formation of a coupling member for connection between the case 300 and the protection circuit module 200. Therefore, it is not necessary to provide a separate coupling member. In the conventional battery pack, a coupling member is separately provided at a protection circuit module to enhance the structural strength of the battery pack. Since the present invention eliminates the need for this separate coupling member, manufacturing costs and manufacturing processes for the battery pack 10 can be reduced.

It is also noted that a conventional battery pack also requires a holder between a protection circuit module and a bare cell in order to stably support the protection circuit module when a protection circuit module is arranged at a side surface of the bare cell. However, in the battery pack 10 according to the current embodiment of the present invention, the protruding portions of the protection circuit module 200 are fitted into the apertures of the case 300, and thus the protection circuit module 200 can be firmly supported by the case 300. Therefore, the use of a holder is not required, thereby further reducing manufacturing costs and further simplifying the process of making the battery pack 10.

Hereinafter, a battery pack 20 according to a second embodiment of the present invention will be described with reference to FIGS. 8 through 10. The battery pack 20 of the second embodiment of the present invention is substantially the same as the battery pack 10 of the first embodiment of the present invention except that a dummy tab and a dummy aperture for the protection circuit module and the case, respectively are further present. Therefore, only the structures and functions of the dummy tab and the dummy aperture will now be described.

Figure 8:
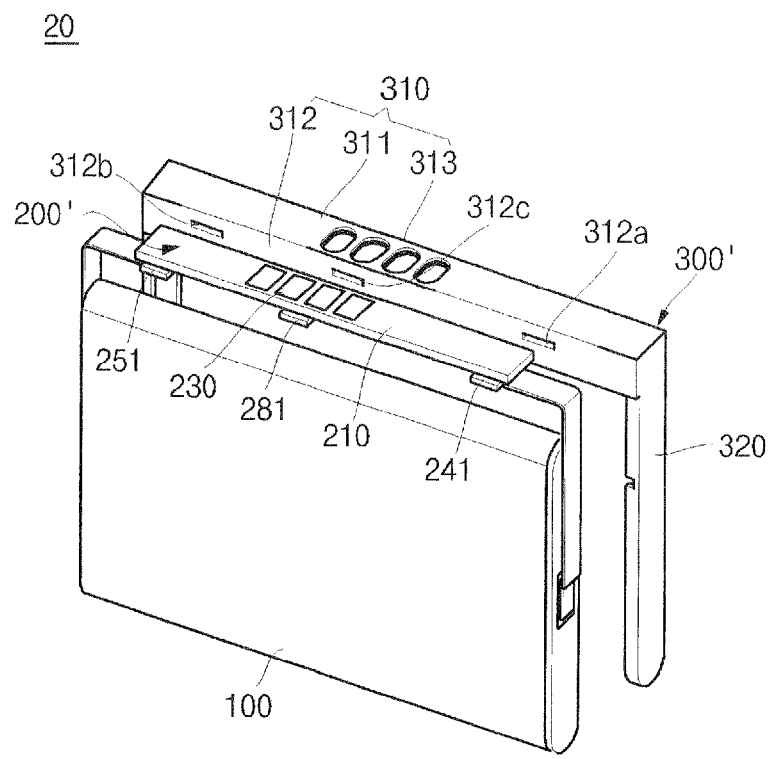
FIG. 8 is an exploded perspective view of a battery pack according to a second embodiment of the present invention.
Figure 9:
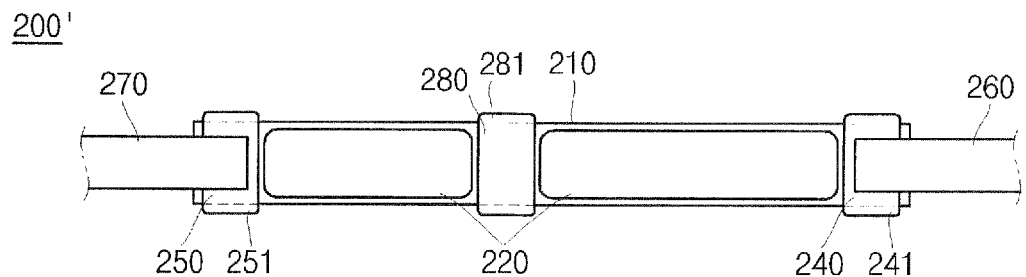
FIG. 9 is a bottom view of a protection circuit module of the battery pack according to the second embodiment of the present invention.
Figure 10:
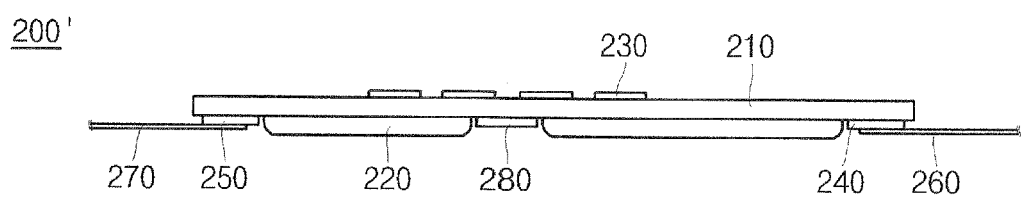
FIG. 10 is a side view of the protection circuit module of FIG. 9.

FIG. 8 is an exploded perspective view of the battery pack 20, and FIGS. 9 and 10 are respectively a bottom view and a side view of a protection circuit module 200' of the battery pack 20. Referring to FIGS. 8 through 10, the battery pack 20 further includes a dummy tab 280 and a dummy aperture 312c. The dummy tab 280 can be arranged at a central portion of a bottom surface of a protection circuit board 210. Specifically, the dummy tab 280 can be arranged between a first tab 240 and a second tab 250 at a central portion of bottom surface of the protection circuit board 210, and can have substantially a square plate shape. The dummy tab 280 partially protrudes out of each of first and second long sides 210c and 210d of the protection circuit board 210, and the protruding portions of the dummy tab 280 is defined as "a dummy protruding portion 281". In this respect, the dummy protruding portion 281 is actually two protruding portions. The dummy tab 280 can be made out of nickel or nickel alloy. The dummy tab 280 is simply welded to a bottom surface of the protection circuit board 210 without being electrically connected to a conductive metal pattern of the protection circuit board 210.

The dummy aperture 312c can be arranged in each of second and third surfaces 312 and 313 of the case 300' to correspond to the dummy protruding portion 281. The dummy aperture 312c can have a shape corresponding to the dummy protruding portion 281 so that the dummy protruding portion 281 can be fitted into the dummy aperture 312c. The dummy protruding portion 281 and the dummy aperture 312c can serve as coupling members for the connection between the protection circuit module 200' and the case 300'.

As described above, the dummy protruding portion 281 and the dummy aperture 312c are coupled to each other. Specifically, the dummy protruding portion 281 is forcedly fitted into the dummy aperture 312c so that the protection circuit module 200' and the case 300' can be joined together firmly. An end of the dummy protruding portion 281 facing the dummy aperture 312c can be tapered in order to facilitate such fitting between the dummy protruding portion 281 and the dummy aperture 312c.

According to the second embodiment of the present invention, when a dummy protruding portion 281 is additionally fitted into a dummy aperture 312c, the coupling force between a protection circuit module 200' and a case 300' is much stronger as compared with the first embodiment, thereby resulting in still more improved structural strength of a battery pack 20.

Hereinafter, a battery pack 30 according to a third embodiment of the present invention will now be described with reference to FIGS. 11 and 12. The battery pack 30 of the third embodiment of the present invention is different from the battery packs 10 and 20 of the first and second embodiments in terms of the positioning and interconnection between a protection circuit module and a bare cell, and the structures of the protection circuit module and the case. Thus, the battery pack 30 will now be described in terms of the differences between it and the battery packs 10 and 20.

Figure 11:
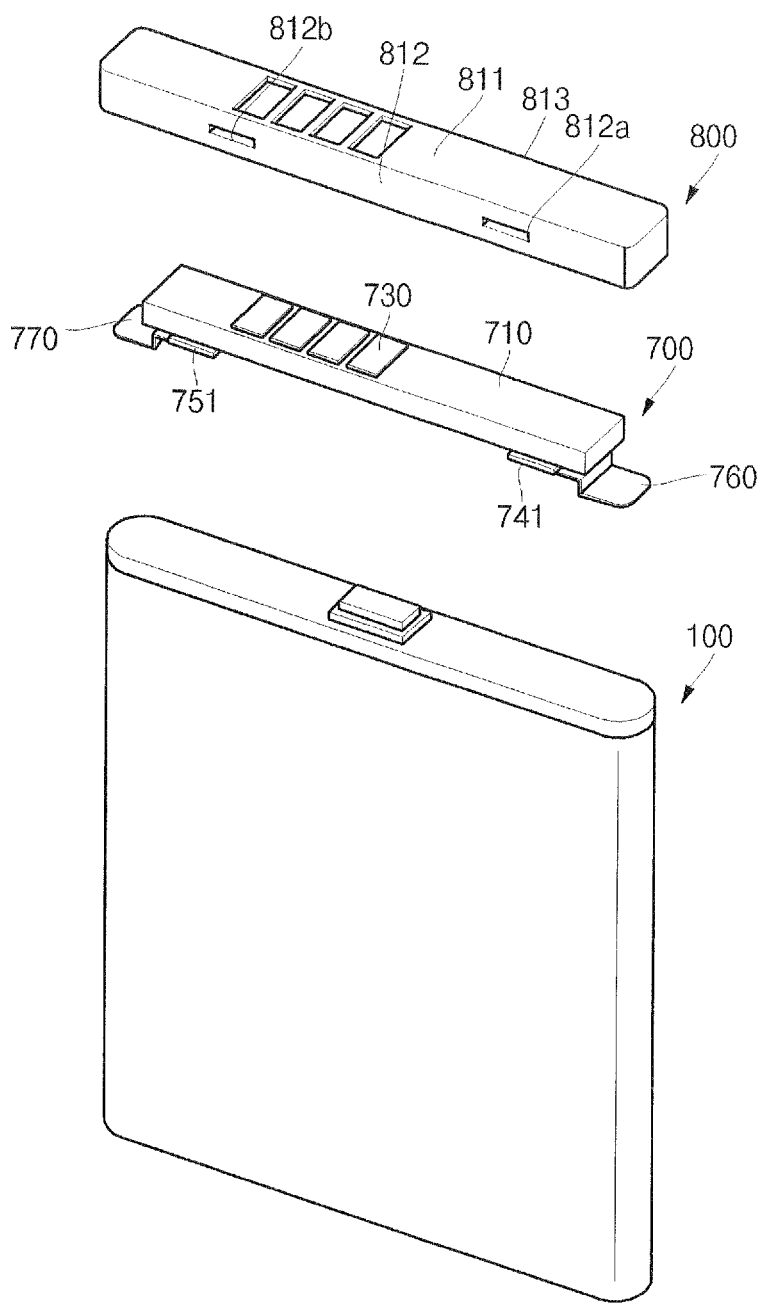
FIG. 11 is an exploded perspective view of a battery pack according to a third embodiment of the present invention.
Figure 12:
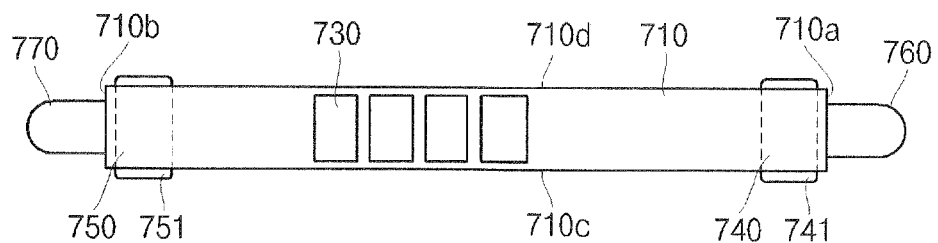
FIG. 12 is a top view of a protection circuit module of the battery pack according to the third embodiment of the present invention.

FIG. 11 is an exploded perspective view of the battery pack 30 and FIG. 12 is a top view of a protection circuit module 700 of the battery pack 30. Referring to FIGS. 11 and 12, the battery pack 30 can include a bare cell 100, the protection circuit module 700, and a case 800. The battery pack 30 can further include a label (not shown) which covers the bare cell 100 and the case 800 to protect the bare cell 100 and the protection circuit module 700 from external impact. Here, the bare cell 100 is substantially the same as those of the previous embodiments, and thus, a description thereof will be omitted.

The protection circuit module 700 can include a protection circuit board 710, a protection circuit device (not shown), a charge-discharge terminal 730, a first tab 740, a second tab 750, a first lead plate 760, a second lead plate 770, and a negative electrode lead plate (not shown). The first and second tabs 740 and 750 of the protection circuit module 700 include first protruding portion 741 and second protruding portion 751 as coupling members that connect the protection circuit module 700 to the case 800.

The protection circuit board 710 can be arranged on the bare cell 100 to be spaced apart from the bare cell 100 by a predetermined distance. In more detail, the protection circuit board 710 can be arranged above the bare cell 100 and can have substantially a rectangular plate shape. A conductive metal pattern can be present on the protection circuit board 710 and can be electrically connected to the protection circuit device, the charge-discharge terminal 730, the first tab 740, and the second tab 750. The protection circuit board 710 can be a PCB. When the protection circuit board 710 is viewed from the top as in FIG. 12, two short sides are defined as a "first short side 710a" and a "second short side 710b", and two long sides as a "first long side 710c" and a "second long side 710d".

The protection circuit device can be arranged between a bottom surface of the protection circuit board 710 and the top surface (in FIG. 12) of the bare cell 100. The protection circuit device is responsible for protecting the bare cell 100 by monitoring information about the charge-discharge state, current, voltage, temperature and other details of the bare cell 100. The protection circuit device can be electrically connected to the conductive metal pattern of the protection circuit board 710.

The charge-discharge terminal 730 is arranged on the protection circuit board 710 and can serve as an electrical connector for connecting the battery pack 30 to an external electronic device (not shown). The first tab 740 can be arranged on a bottom surface at the first short side 710a of the protection circuit board 710, and can have substantially a square plate shape. The first tab 740 can be designed to partially protrude out of each of the first and second long sides 710c and 710d of the protection circuit board 710, and the protruding portions of the first tab 740 is defined as "a first protruding portion 741". In this respect, the first protruding portion is actually a pair of first protruding portions. The first tab 740 can be made out of nickel or nickel alloy, and be electrically connected to the conductive metal pattern on the protection circuit board 710.

The second tab 750 can be arranged on a bottom surface at the second short side 710b of the protection circuit board 710, and have substantially a square plate shape. The second tab 750 can be designed to partially protrude out of each of the first and second long sides 710c and 710d of the protection circuit board 710, and the protruding portions of the second tab 750 is defined as "a second protruding portion 751". In this respect, second protruding portion 751 actually includes a pair of protruding portions. The second tab 750 can be made out of nickel or nickel alloy and be electrically connected to the conductive metal pattern on the protection circuit board 710.

The first lead plate 760 can be arranged at the first short side 710a of the protection circuit board 710. An end of the first lead plate 760 can be electrically connected to the first tab 740 through welding, and the other end can be electrically connected to a cap plate (not shown) of the bare cell 100. A positive electrode plate (not shown) of an electrode assembly (not shown) of the bare cell 100 is electrically connected to the cap plate through welding, and thus, the cap plate has a positive polarity. Thus, the first lead plate 760 and the first tab 740 have a positive polarity.

The second lead plate 770 can be arranged at the second short side 710b of the protection circuit board 710. One end of the second lead plate 710 can be connected to a bottom surface of the second tab 750 through welding, and the other end can be connected to the cap plate of the bare cell 100 through welding. The second lead plate 770 can be electrically connected to the cap plate, and thus, can serve as an electrical conductor, like the first lead plate 760. On the other hand, the second lead plate 770 can also serve as a dummy lead plate for stably holding the protection circuit module 700 on the bare cell 100 by simply being connected to the bottom surface of the protection circuit board 710. The negative electrode lead plate of the protection circuit board 710 can be arranged to correspond to an electrode terminal (not shown) of the bare cell 100 so as to be electrically connected to the electrode terminal.

The case 800 can be arranged on the protection circuit module 700 to surround the protection circuit module 700 and the top surface (in FIG. 11) of the bare cell 100. The case 800 can include a first surface 811, which corresponds to the top surface of the protection circuit module 700 and has a rectangular shape, and second and third surfaces 812 and 813 which extend downward from two long sides of the first surface 811 and also have a rectangular shape. A charge-discharge terminal receiving aperture can be arranged on the first surface 811 of the case 800 to correspond to the charge-discharge terminal 730 of the protection circuit module 700. The charge-discharge terminal 730 can be exposed to outside via the charge-discharge terminal receiving aperture.

Each of the second and third surfaces 812 and 813 of the case 800 can include a first aperture 812a and a second aperture 812b corresponding to the first and second protruding portions 741 and 751, respectively. In more detail, the first aperture 812a and the second aperture 812b can perforate the second surface 812 to respectively correspond to the first protruding portion 741 and the second protruding portion 751, and similarly, the first aperture 812a and the second aperture 812b can also penetrate the third surface 813 of case 800 to respectively correspond to the first protruding portion 741 and the second protruding portion 751. The first and second apertures 812a and 812b can have shapes corresponding to the first and second protruding portions 741 and 751 so that the first and second protruding portions 741 and 751 can be fitted into the first and second apertures 812a and 812b.

The first and second protruding portions 741 and 751 and the first and second apertures 812a and 812b can serve as coupling members for connecting the protection circuit module 700 to the case 800. The first and second protruding portions 741 and 751 can be coupled to the first and second apertures 812a and 812b, respectively. Specifically, the first and second protruding portions 741 and 751 can be forcedly fitted into the first and second apertures 812a and 812b so that the protection circuit module 700 and the case 800 can be joined together firmly.

In the battery pack 30 according to the third embodiment of the present invention, the first and second protruding portions 741 and 751 of the protection circuit module 700 are fitted into the first and second apertures 812a and 812b of the case 800, thereby leading to a higher coupling force between the protection circuit module 700 and the case 800, resulting in the improved structural strength of the battery pack 30. Here, the first and second protruding portions 741 and 751 are protruding portions of the first and second tabs 740 and 750, the first and second tabs 740 and 750 being electrically connected to the first and second lead plates 760 and 770 of the protection circuit module 700. That is, the first and second tabs 740 and 750, which are essential elements for electrical connection between the bare cell 100 and the protection circuit module 700, can be configured to protrude out of the first and second long sides of the protection circuit board 710, thereby enabling easy formation of coupling members for connection between the case 800 and the protection circuit module 700. Therefore, it is not necessary to separately provide a coupling member as in the conventional battery pack to enhance the structural strength of the battery pack. By being able to provide coupling members without having to include a separate element for the coupling, manufacturing simplicity is increased and manufacturing costs are reduced.

As is apparent from the above description, according to the inventive battery pack, a protruding portion of a protection circuit module is fitted into an aperture of a case, thereby leading to a higher coupling force between the protection circuit module and the case, resulting in improved structural strength of a battery pack. Further, such fitting between a protruding portion of a protection circuit module and an aperture of a case enables the omission of a holder that is commonly used to support a protection circuit module on a surface of a bare cell, thereby leading to reduced manufacturing costs and processes. By incorporating the coupling members into the design of the battery pack without requiring the addition of additional parts, simplicity in design and production is further improved and manufacturing costs are further reduced.

Although a few embodiments of the present invention have been shown and described, it would be appreciated by those skilled in the art that changes can be made in this embodiment without departing from the principles and spirit of the invention, the scope of which is defined in the claims and their equivalents.

What is claimed is:
1. A battery pack, comprising:
   a bare cell;
   a protection circuit board arranged on the bare cell and separated from the bare cell by a distance, the protection circuit board including a top surface, a bottom surface, first and second short sides and first and second long sides;
   a case arranged on the protection circuit board; and
   first and second tabs respectively arranged on the bottom surface and at locations that correspond to the first and second short sides of the protection circuit board, the first and second tabs each including protruding portions extending from the protection circuit board and being inserted into corresponding tab receiving through holes perforating sidewalls of the case, each of the first and second tabs being electrically conductive and being electrically connected to a conductive metal pattern on the protection circuit board.

2. The battery pack of claim 1, wherein the protruding portions protrude out of each of the first and second long sides of the protection circuit board.

3. The battery pack of claim 2, wherein the case comprises a first surface facing upward and second and third surfaces extending downward from the first surface, the tab receiving through holes are arranged in each of the second and third surfaces, respectively.

4. The battery pack of claim 1, wherein the tab receiving through holes have a shape that corresponds to that of a cross section of the protruding portions.

5. The battery pack of claim 1, wherein the protruding portions are forcedly fitted into the tab receiving through holes.

6. The battery pack of claim 1, further comprising a dummy tab having dummy protruding portions that protrude out from a central portion of each of the first and second long sides of the protection circuit board, wherein the case further comprises dummy through holes to receive the dummy protruding portions.

7. The battery pack of claim 1, wherein the protection circuit board further comprises first and second lead plates connected to the first and second tabs, respectively.

8. The battery pack of claim 7, wherein the protection circuit board is arranged on a side surface of the bare cell that is a surface other than that which corresponds to an electrode terminal of the bare cell.

9. The battery pack of claim 1, wherein the first and second tabs and the protruding portions are comprised of either nickel or a nickel alloy.

10. A battery pack, comprising:
a bare cell;
a protection circuit module arranged on the bare cell; and
a case arranged on the protection circuit module, wherein the protection circuit module comprises:
a protection circuit board arranged on the bare cell and separated from the bare cell by a distance, the protection circuit board including first and second short sides, first and second long sides and upper and lower major surfaces, the protection circuit board also including conductive metal patterns arranged on the lower major surface;
first and second tabs respectively arranged on the lower major surface and at locations corresponding to the first and second short sides of the protection circuit board;
first and second lead plates electrically connected to the conductive metal patterns on the protection circuit board by being connected to the first and second tabs, respectively, wherein the first lead plate is electrically connected to an electrode terminal arranged on a surface of the bare cell, and the second lead plate is electrically connected to the opposite surface of the bare cell, and wherein the protection circuit module is coupled to the case by inserting end portions of the first and second tabs into corresponding through holes in sidewalls of the case.

11. The battery pack of claim 10, wherein the first and second tabs are comprised of a material selected from a group consisting of nickel and nickel alloy.

12. The battery pack of claim 10, wherein the through holes in the sidewalls of the case have a shape and size that corresponds to that of the end portions of the first and second tabs.

13. A battery pack, comprising:
a bare cell;
a protection circuit module arranged on the bare cell; and
a case arranged on the protection circuit module, wherein the protection circuit module includes first and second lead plates electrically connected to a printed circuit board by first and second metallic tabs arranged at opposite ends of the printed circuit board respectively, and each of the first and second metallic tabs include protruding portions that are forcedly fitted into apertures arranged in the case to firmly join the protection circuit module to the case.

14. The battery pack of claim 13, the first lead plate being electrically connected to an electrode terminal of the bare cell, and the second lead plate is electrically connected to the opposite surface of the bare cell from that of the electrode terminal.

15. The battery pack of claim 13, the bare cell including an electrode terminal arranged on a surface of the bare cell other than that corresponding to the printed circuit board.

16. The battery pack of claim 13, each of the first and second lead plates are folded at an angle of 90 degrees at locations that correspond to contact edges between a side surface of the bare cell and top and bottom surfaces of the bare cell.

17. The battery pack of claim 13, the protruding portions having a shape that corresponds to a shape of the apertures in the case.

18. The battery pack of claim 13, the printed circuit board being arranged to correspond to a long, narrow side surface of the bare cell.

* * * * *